July 24, 1923.

E. ADAMSON

POWER PLANT

Filed April 12, 1920

1,462,470

4 Sheets-Sheet 3

Erne Adamson
Inventor

By Thomas R. Harvey
Attorney

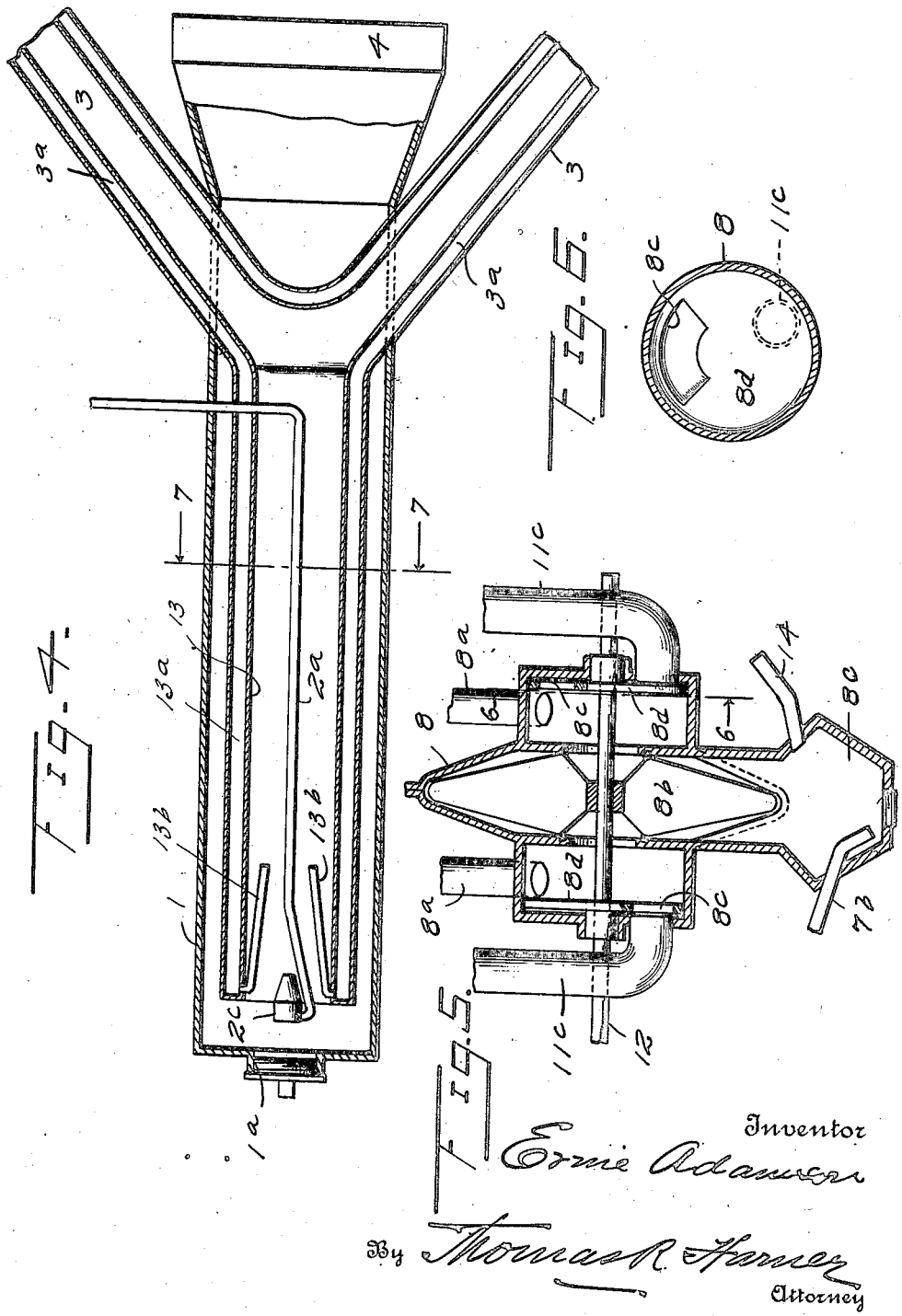

Patented July 24, 1923.

1,462,470

UNITED STATES PATENT OFFICE.

ERNIE ADAMSON, OF NEW YORK, N. Y.

POWER PLANT.

Application filed April 12, 1920. Serial No. 373,320.

*To all whom it may concern:*

Be it known that I, ERNIE ADAMSON, a citizen of the United States of America, residing at New York, in the county of New York and State of New York, have invented certain new and useful Improvements in Power Plants, of which the following is a specification.

My present invention relates generally to power plants, and more particularly to a novel, efficient, and economical arrangement for generating electric current which needs practically no attention after it is once started; my object being the provision of a unit plant and one which is self contained in so far as the automatic formation of its motive fluid is concerned.

Figure 1:
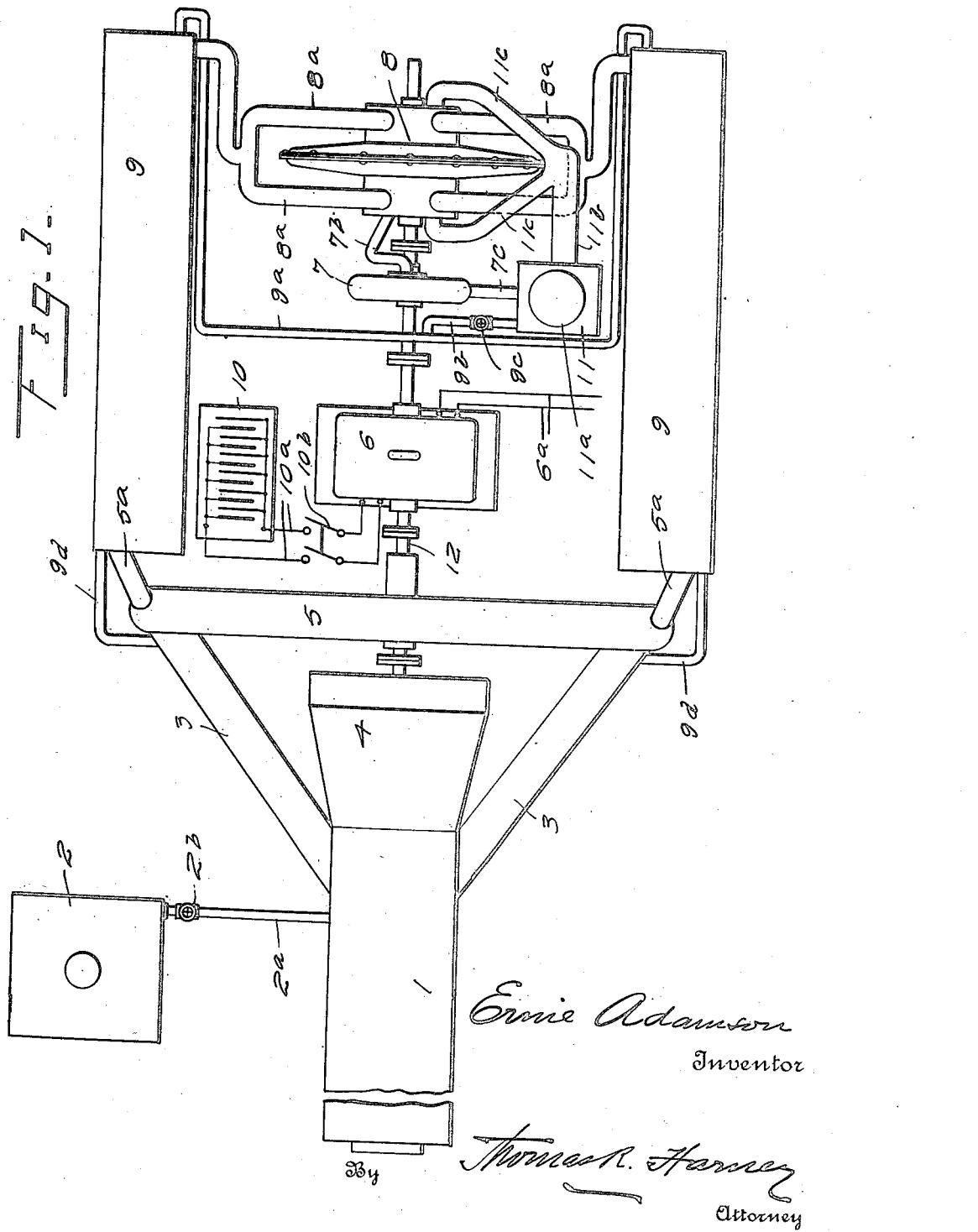
Figure 2:
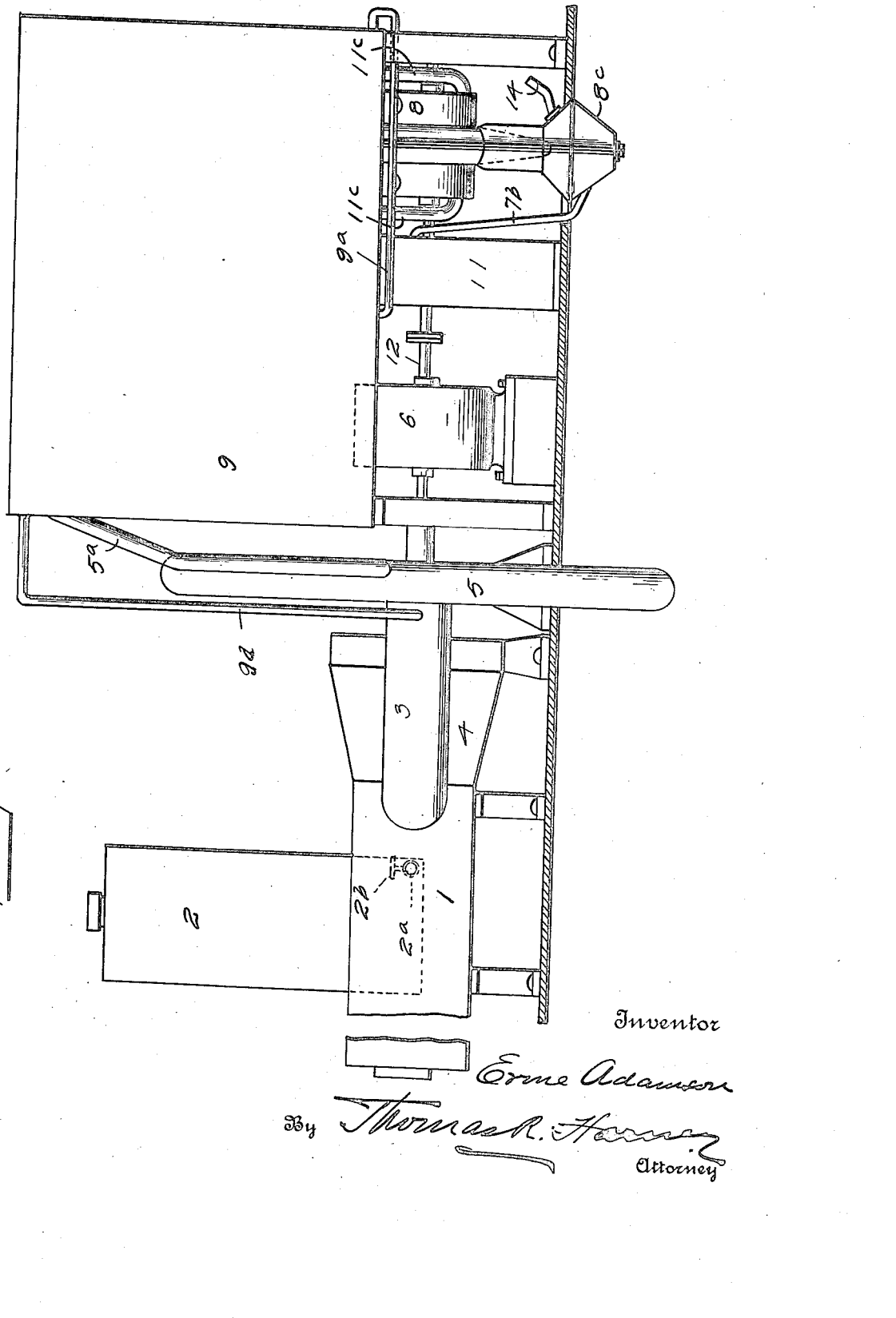
Figure 3:
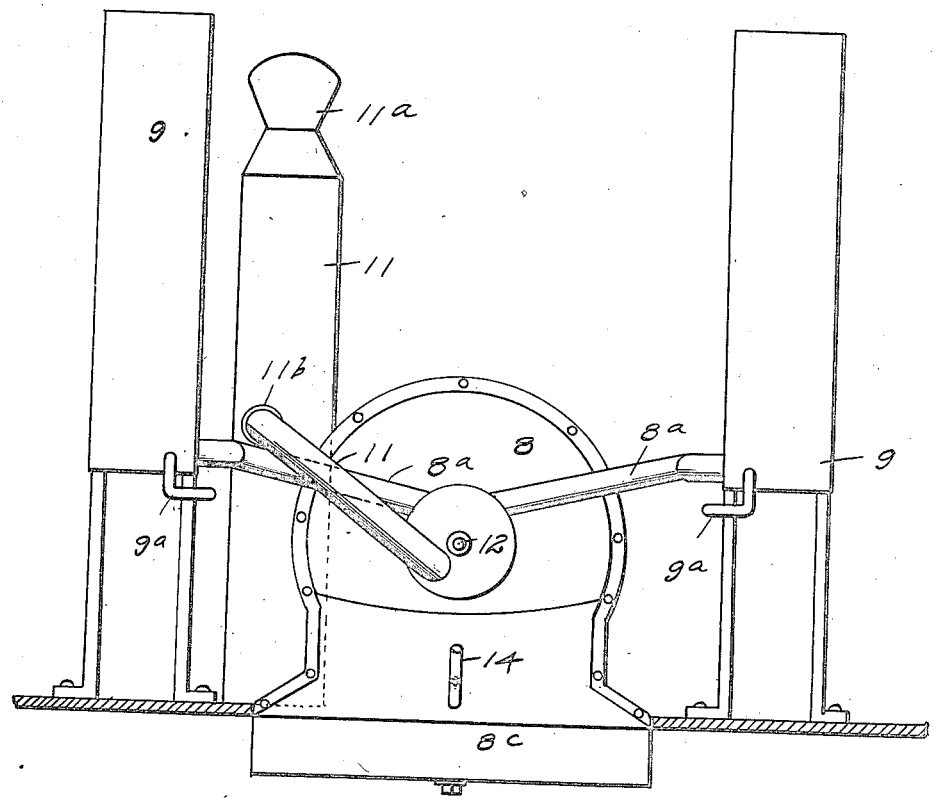
Figure 7:
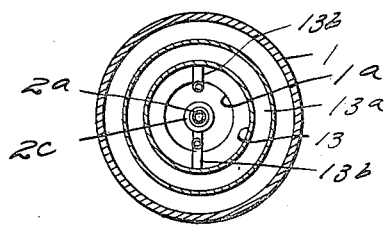

Various other objects relate to the arrangement of the plant and the structure of its component co-operating parts and will be better understood from the following description in which reference is made to the accompanying drawings, forming a part of this specification and in which, Figure 1 is a top plan view, more or less diagrammatic, illustrating the power plant proposed by my invention, Figure 2 is a side view also more or less diagrammatic, Figure 3 is an end view partly broken away and in section, Figure 4 is a horizontal section through the fluid generator, Figure 5 is a vertical longitudinal section through the exhaust pump, Figure 6 is a cross section taken on line 6—6 of Figure 5, and Figure 7 is a detail cross section taken on line 7—7 of Figure 4.

Referring now to Figure 1 which best illustrates the complete plant, a motive fluid generator 1 generates its fluid in part from the supply of volatile combustible oil from a tank 2 whose supply pipe $2^a$ has a controlling valve $2^b$. The generator supplies motive fluid through headers 3 to diametrically opposite points of a turbine 5, the headers being rearwardly divergent upon relatively opposite sides of a blower 4 which supplies the generator 1 with air in a manner to be presently described.

The motive fluid expands through the turbine 5 and passes through pipes $5^a$ to condensers 9 receiving water through branch pipes $9^a$ from a pipe $9^b$ having a controlling valve $9^c$, which water, after circulation through, and being preheated within, the condensers, passes through pipes $9^d$ to the water jackets $3^a$ of the headers 3 for a purpose to be presently described.

The turbine 5 is mounted to rotate a shaft 12 to the forward end of which the blower 4 is secured, and upon which shaft is mounted a centrifugal water pump 7 whose outlet pipe $7^c$ leads to a water and air tank 11 having an air bell $11^a$ to assist in maintaining constant pressure and avoiding water hammer. The condenser supply pipe $9^b$ leads from tank 11 and there also leads therefrom a pipe $11^b$ having branches $11^c$ extending to opposite sides of an exhaust pump 8 which is connected to the rear portions of the condensers 9 by pipes $8^a$.

The exhaust pump 8 is mounted on shaft 12 and there is also mounted on this shaft a motor-dynamo 6 from which main feed wires $6^a$ lead and to which a storage battery 10 is connected by wires $10^a$ having therein a switch $10^b$.

Referring now to Figure 4, the generator 1 is in the form of an elongated cylinder having a normally covered hand hole $1^a$ at its forward end and communicating at its rear end with the blower 4. Within this cylinder is a cylindrical combustion chamber 13 having a water jacket $13^a$, said cylinder and its jacket being respectively in communication at their rear ends with the headers 3 and their water jackets $3^a$. The combustion chamber 13 is spaced from the wall of the generating chamber so as to form therebetween an air jacket around the water jacket. At its forward end, the combustion chamber 13 is open adjacent to the covered hand hole $1^a$ of the generator and receives an axially disposed rearwardly opening oil nozzle $2^c$ connected upon the inner forward end of the oil supply pipe $2^a$ the latter of which passes through the major portion of the combustion chamber as shown. From the forward end of the water jacket $13^a$ water nozzles $13^b$ project inwardly and rearwardly at opposite sides of the oil nozzle $2^c$ so as to inject steam into the combustion space which is thus open to the reception of air through its forward end.

Referring now to Figure 5, the exhaust pump 8 includes a rotor $8^b$ rotating in its enlarged central portion for the centrifugal discharging of fluid from the condensers 9, into a well $8^c$ from which leads a gas exhaust 14 and the intake pipe $7^b$ of the centrifugal water pump 7. The rotor 8ᵇ is of a double face type and intermittently receives water from the feed pipes 11ᶜ by virtue of valve discs 8ᵈ rotating with the rotor on shaft 12 across the ends of said pipes 11ᶜ, and provided with segmental openings 8ᵉ. Thus intermittent water plungers are formed which entrain the products of combustion, the condensed fluid commingling with the water for re-use in the generator, and the gases passing outwardly through the exhaust 14.

It is thus obvious that to start operations it is simply necessary to see that tank 11 has a sufficient supply of water and that the water and oil valves 9ᶜ and 2ᵇ are properly turned on. Then by closing switch 10ᵇ member 6 is utilized as a starting motor on current from the storage battery 10, thus rotating shaft 12 which instantly sets in motion the water circulating pump 7 and the air blower 4. With the hand hole 1ᵃ open, the operator inserts a light and starts combustion and the products of this combustion are soon joined by steam and proceed through the turbine and the condensers as before described, the condensed water being separated in the exhausting pump 8 and the gases finally passing out through the exhaust 14. In the meantime the switch 10ᵇ is opened and the member 6 thereafter acts as a dynamo, the current developed passing out to the point of use along the feed wires 6ᵃ.

It is thus obvious that when once started and properly adjusted and operating, my improved power plant needs practically no further attention, and will be economical both as to fuel oil and water, will develop to a high percentage the power involved, and will avoid wasted heat units.

I claim:

1. A power plant of the character scrib including a turbine, a shaft on which the turbine is mounted, motive fluid forming means including a combustion chamber having a motive fluid supply connection leading to the turbine, a blower on the turbine shaft supplying air to the combustion chamber, a water jacket around the said supply connection having an outlet leading into the combustion chamber, a condenser through which the motive fluid is exhausted from the turbine, having an outlet for the condensing liquid connected to the water jacket of the motive fluid supply connection, an exhaust pump on the turbine shaft for withdrawing fluid from the condenser, and a pump on the turbine shaft for forcing condensing liquid through the condenser.

2. A power plant of the character described including a turbine, a shaft on which the turbine is mounted, motive fluid forming means including a combustion chamber having a motive fluid supply connection leading to the turbine, a blower on the turbine shaft supplying air to the combustion chamber, a water jacket around the said supply connection having an outlet leading into the combustion chamber, a condenser through which the motive fluid is exhausted from the turbine, having an outlet for the condensing liquid connected to the water jacket of the motive fluid supply connection, an exhaust pump on the turbine shaft for withdrawing fluid from the condenser, a pump on the turbine shaft having a liquid intake connection leading from the exhaust pump and having a liquid outlet connection leading to the condenser, and pressure equalizing means in said outlet connection of the liquid pump for the purpose described.

3. A power plant including a turbine, motive fluid forming means including a combustion chamber connected to the turbine, a shaft on which the turbine is mounted, water and air supplying means for the combustion chamber mounted on the turbine shaft exhaust fluid condensing means through which water is supplied to the combustion chamber, and means mounted on and actuated by the turbine shaft for separating condensable fluids from the gases of combustion to permit of re-use of such fluids in the combustion chamber and also acting as an exhausting means for said condensing means.

4. A power plant including a turbine, motive fluid forming means including a combustion chamber having jacketed connection with the turbine, a turbine shaft, a blower supplying air to the combustion chamber and mounted on the turbine shaft, a condenser for the exhaust fluid, means for feeding water to the combustion chamber through the condenser and the jacket of the turbine supply connection, and means for separating condensable fluid from the gases of combustion for re-use.

In testimony whereof I have affixed my signature.

ERNIE ADAMSON.